United States Patent [19]

Poe

[11] 4,068,522
[45] Jan. 17, 1978

[54] GAS LEAK DETECTOR

[75] Inventor: Lloyd Richard Poe, Long Beach, Calif.

[73] Assignee: Hartwell Corporation, Placentia, Calif.

[21] Appl. No.: 757,080

[22] Filed: Jan. 5, 1977

Related U.S. Application Data

[63] Continuation-in-part of Ser. No. 693,754, June 8, 1976, abandoned.

[51] Int. Cl.² ............................................. G01M 3/08
[52] U.S. Cl. .................................................. 73/40.5 R
[58] Field of Search ............................... 73/40, 40.5 R

[56] References Cited

U.S. PATENT DOCUMENTS

| | | | |
|---|---|---|---|
| 1,901,432 | 3/1933 | Bradley | 73/40.5 R |
| 1,959,863 | 5/1934 | Griss | 73/40.5 R X |
| 2,796,757 | 6/1957 | Peterson | 73/40 |
| 3,103,910 | 9/1963 | Smith et al. | 73/40 X |
| 3,177,702 | 4/1965 | Anderson | 73/40 |
| 3,221,540 | 12/1965 | Kilbourn | 73/40 X |

FOREIGN PATENT DOCUMENTS

| | | | |
|---|---|---|---|
| 1,075,861 | 4/1954 | France | 73/40 |

Primary Examiner—Charles A. Ruehl
Assistant Examiner—Joseph W. Roskos
Attorney, Agent, or Firm—Lyon & Lyon

[57] ABSTRACT

A gas leak detector incorporated in a rotary valve intended to be mounted in a gas system adjacent the source of gas, the detector valve having a first position permitting flow from the source into the system, and a second position in which any gas entering the system due to a large or small leak in the system is made visible as it passes through a bubble chamber. Alternatively, a U-tube monometer is used to indicate drop in pressure due to a leak in the system. Also two embodiments are arranged as to be assembled for left hand or right hand use, one of which is arranged to be held in TEST position, the valve moving to OFF position when released while in TEST position.

3 Claims, 21 Drawing Figures

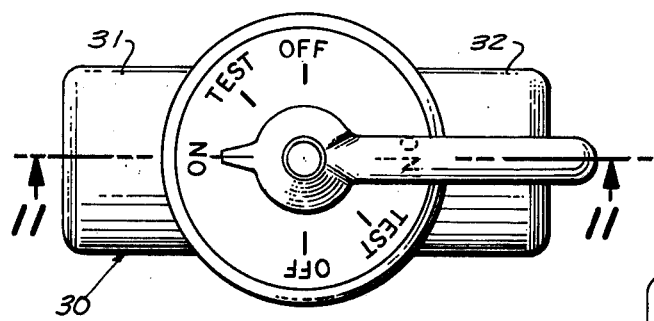
Fig. 10
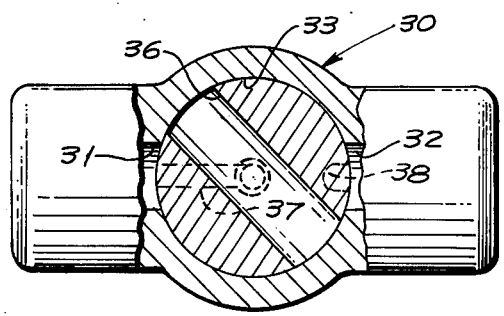
Fig. 12
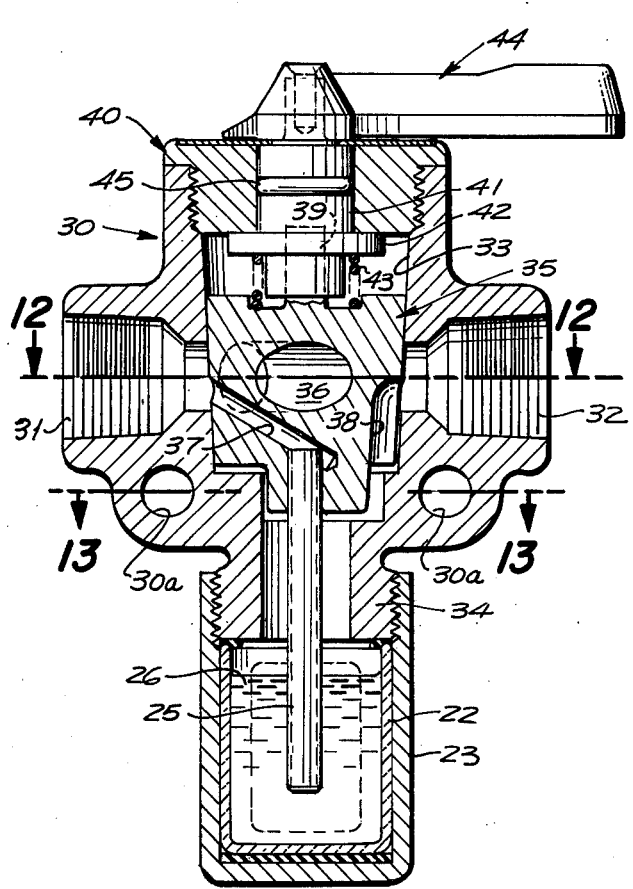
Fig. 11
Fig. 13

GAS LEAK DETECTOR

This application is a continuation-in-part of copending application, Ser. No. 693,754 filed June 8, 1976, now abandoned.

BACKGROUND

Gas leak detectors for fluid systems have been used, such as the leak detector shown in U.S. Pat. No. 3,583,435. Such leak detectors are particularly useful in gas systems which utilize high pressure butane or propane gas containers, for example, but not limited to, mobile homes, boats, campers, and the like. The leak detectors not only minimize waste of gas, but, more importantly, detect small leaks and hazardous leaks. It is essential that the leak detector be easily and quickly operated to encourage frequent tests, and at the same time be an absolutely positive device regarding the existence of a leak. The leak detector described by U.S. Pat. No. 3,583,435 can be partially operated by pushing only part way on the operating button allowing gas to continue flowing normally. The operator may, however, think the detector is actually testing for leaks when it is not.

The time of flow at the normal low pressures of ½ to 1 psig is another weakness in a spring loaded, push-button detector actuator which returns to the line flow position automatically rather than a shut off position. The detector actuator must be held in place until the entire system is filled. This can be 10 to 15 seconds for an average system, and fatigue may cause the operator to relax the pressure on the button allowing gas to continue flowing into the system and perhaps resulting in an undetected leak.

SUMMARY

The present invention is directed to a gas leak detector which is summarized in the following objects:

First, to provide a gas leak detector which incorporates a tapered rotary valve forming a primary seal and a secondary seal to minimize contribution to any leakage and is dependably shut off after test.

Second, to provide a gas leak detector as indicated in the previous object wherein a readily visible bubble chamber is provided and the valve is adapted to be turned between a full line flow position, for supplying the gas system; a bypass or test position wherein, should a leak be present downstream of the detector exit, a limited supply of gas is drawn through the bubble chamber for detection; and a positive shut-off position for use should a leak be detected or it is desired to close the system for any reason.

Third, to provide a leak detector, utilizing a bubble chamber, which is so arranged that, prior to installation, the bubble chamber is maintained in a sealed condition placing the valve in its positive shut-off position to prevent escape of liquid therefrom without the need for separable sealing means which must be removed in order to install the leak detector; however, an inexpensive cardboard sleeve may be inserted in the valve to prevent turning of the valve to its leak detecting position for purposes of shipment or storage prior to use.

Fourth, to provide a gas leak detector which may be arranged to use a U-tube monometer to demonstrate a leak in the gas system by a difference in liquid level.

Fifth, to provide a gas leak detector arranged to be mounted either side contiguous to a wall, the detector including a handle which may be mounted to turn outwardly from the wall irrespective of which side of the detector is contiguous to the wall.

Sixth, to provide a gas leak detector which is so arranged that when turned to its testing position it is subject to spring force tending to return the detector to its off position, thereby eliminating the chance that the detector will remain in its testing position once the test is completed.

DESCRIPTION OF THE FIGURES

FIG. 10 is a top view of a further embodiment of the gas leak detector capable of arrangement for right hand or left hand installation, and shown in its on position.

FIG. 11 is a longitudinal sectional view thereof taken through 11—11 of FIG. 10, with the plug valve shown in its test position.

FIGS. 12 and 13 are transverse sectional views thereof taken respectively through 12—12 and 13—13 of FIG. 11.

DETAILED DESCRIPTION

Figure 1:
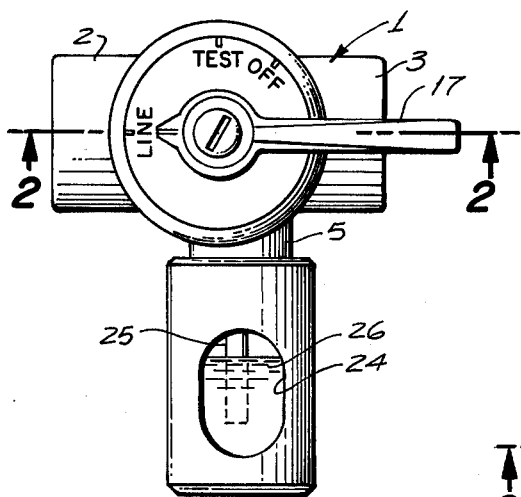
FIG. 1 is a side view of the gas leak detector showing the control handle in position for full line flow.

The gas leak detector includes a valve body 1 having an inlet 2, an outlet 3, disposed in alignment and separated by a transversely extending valve chamber 4. The valve body also includes a depending boss 5. Extending downwardly through the boss 5 from the chamber 4 is a pair of downwardly extending inward and outward leak flow or pressure sensing passages 6 and 7.

The valve chamber 4 of the valve body 1 receives a tapered plug valve 8 having a transversely extending main flow passage 9 positioned to align with the inlet and outlet 2 and 3. The plug valve is also provided with a leak flow or pressure sensing passage 10 extending radially with respect to the main flow passage and essentially diametrically opposite therefrom there is provided a leak flow or pressure sensing recess 11. The larger end of the plug 8 is provided with a polygonal stem 12.

The larger end of the valve chamber 4 is internally screwthreaded and receives a screwthreaded cap 13. Journalled within the cap 13 is a drive stem 14, the inner end of which is provided with a drive socket to receive the polygonal stem 12. The drive stem 14 is provided with a flange 15 and a spring 16 is interposed between the flange and plug 8 to urge the plug into the tapered chamber to maintain a sealing fit. The outer end of the drive stem 14 receives a handle 17, and a seal ring 18 is provided between the drive stem 14 and cap 13.

The smaller end of the plug 8 is provided with a projection forming a stop 19 and the body 1 includes a cover portion 20 provided with a stop boss 21. The stop 19 and boss 21 are proportioned to provide approximately 135° of relative motion.

Located below the depending boss 5 is a transparent bubble chamber cup 22 which is received in a cup shaped protective enclosure 23 having diametrical openings 24 and arranged for screwthread connection to the depending boss 5. The bubble chamber cup 22 is partially filled with an essentially non-evaporative liquid such as mineral oil. The bubbler tube 25 is secured in the inward leak flow passages and extends downwardly therefrom into the liquid 26.

Figure 2:
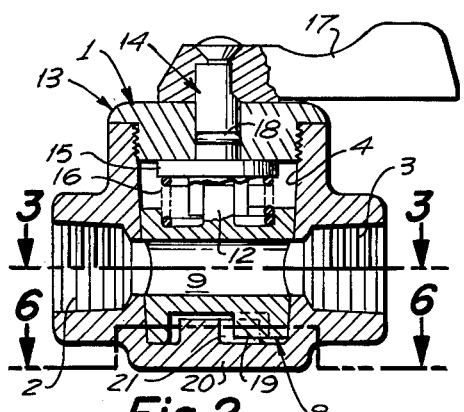
FIG. 2 is a sectional view thereof taken through 2—2 of FIG. 1.
Figure 6:
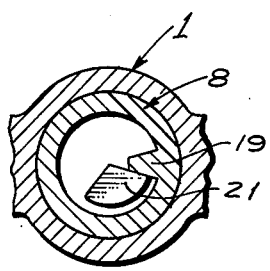
FIG. 6 is a fragmentary sectional view taken through 6—6 of FIG. 2.
Figure 3:
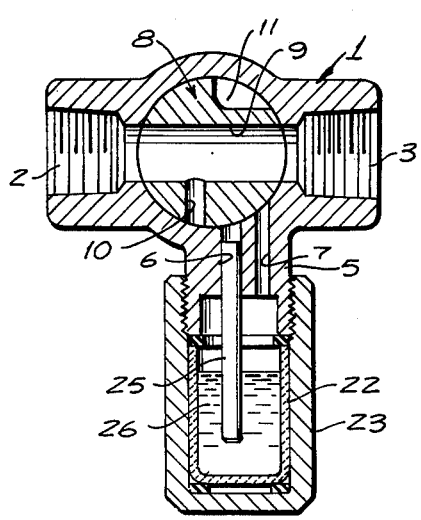
FIG. 3 is a sectional view taken through 3—3 of FIG. 2.

When the gas leak detector is in the position shown in FIGS. 1, 2 and 3, it functions merely as a valve permitting full flow through the inlet 2, main flow passage 9 and outlet 3 to the gas system. The bubble chamber cup 22 and the leak flow passages 6 and 7 are sealed by the plug valve 8.

Figure 4:
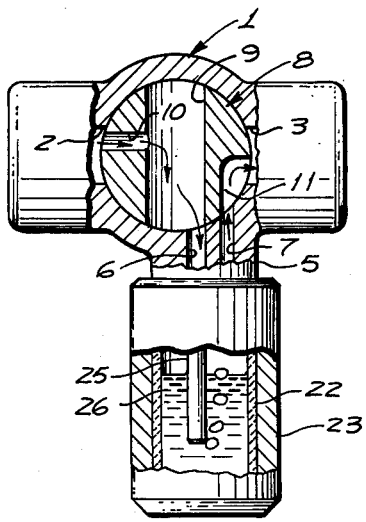
FIG. 4 is a sectional view corresponding to FIG. 3 showing the leak detector in its leak testing position, portions being shown in elevation.

When it is desired to determine the presence or absence of leakage in fluid system connected with the outlet 3, the plug valve is turned essentially 90°, as shown in FIG. 4, so that flow between the inlet 2 and outlet 3 is closed off except for flow through to the leak flow passage 10, a portion of the main flow passage 9, the inward leak flow passage 6 and tube 24 into the bubble chamber cup 22, producing bubbles in the liquid as the gas flows upwardly and into the outward leak flow passage 7 for discharge into the outlet 3. If there is no leakage downstream from the outlet 3, no flow occurs and the bubble chamber is free of bubbles.

Figure 5:
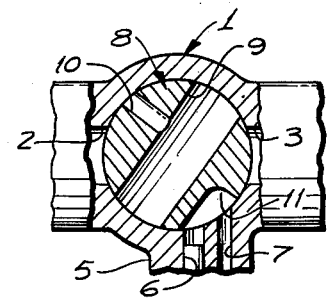
FIG. 5 is a further fragmentary sectional view corresponding to FIG. 3 showing the leak detector in its off position.

If leakage is detected, or if for any reason it is desired to shut off flow to the gas system, the plug valve is turned approximately 45° further completely closing the inlet 2 as shown in FIG. 5. Thus the valve functions both as a leak detector and a shut-off valve.

It should be noted that, when the plug is in its full open position as well as in its full closed position, the entrance to and the exit from the bubble chamber is closed preventing escape of liquid. Also, by inserting, for example, a cardboard sleeve in the open main flow passage 9, inlet 2 and outlet 3, the entrance to and exit from the bubble chamber is designed to prevent leakage therefrom during shipment, or storage prior to use.

Figure 7:
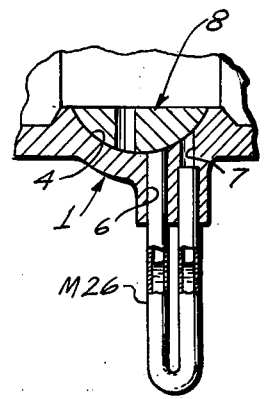
FIG. 7 is a fragmentary sectional view of an embodiment of the leak detector utilizing a U-tube monometer.

Referring to FIG. 7, the boss 5 may be reduced in size, shortening the leak flow or pressure sensing passages 6 and 7. These passages may be connected by a U-tube monometer M26. With this arrangement a heavy liquid such as mercury may be used in which case leakage is indicated by displacement of the liquid in the U-tube without flow of gas into the gas system.

Figure 8:
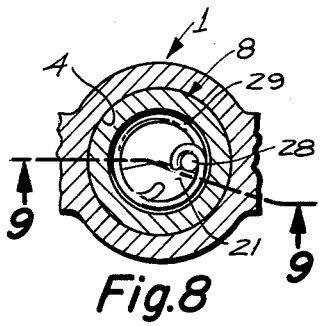
FIG. 8 is a sectional view similar to FIG. 6 but showing a modified form of the plug valve utilizing a spring for return movement.
Figure 9:
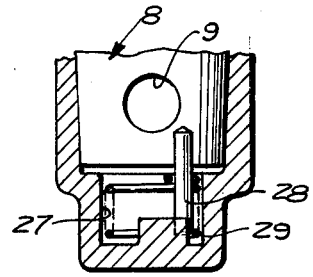
FIG. 9 is a fragmentary sectional view thereof taken through 9—9 of FIG. 8.

Referring to FIGS. 8 and 9, the construction in most respects is similar to that shown in FIGS. 1 through 6, the essential difference being that the housing 4 is extended forming a spring chamber 27, a pin 28 is substituted for the stop 19, the arcuate extent of the boss 21 is increased to limit movement between the full open line position shown in FIG. 3 and the test position shown in FIG. 4. A spring 29 is interposed between the pin 28 and the boss 21 to urge the plug valve to its full open or line position. With this arrangement the handle must be manually retained in its test position for test purpose, for upon release, the valve automatically moves to full open or line position.

Referring to FIGS. 10 through 13, the embodiment here illustrated contains all of the features of the embodiments shown in FIGS. 1 through 6; however, the valve and bubble chamber are coaxial and arranged so that the handle may be right hand or left hand mounted. More particularly, this embodiment of the gas leak detector includes a valve body 30 having an inlet 31, an outlet 32, disposed in alignment and separated by a vertically extending tapered valve chamber 33 open at its upper end. The valve body also includes a depending boss 34 in axial alignment with the valve chamber. Below the inlet 31 and outlet 32 the valve body is provided with a pair of horizontal mounting bores 30a.

The valve chamber 33 of the valve body 30 receives a tapered plug valve 35 having a transversely extending main flow passage 36 positioned to align with the inlet and outlet 31 and 32. The plug valve is also provided with a leak flow or pressure sensing passage 37 extending radially and downwardly under the main flow passage 36. Essentially diametrically opposite therefrom there is provided a vertically extending leak flow or pressure sensing channel 38 formed in the plug valve. The larger upper end of the plug valve 35 is provided with a polygonal stem 39.

The upper end of the valve chamber 33 is internally screwthreaded and receives a screwthreaded cap 40. Journalled within the cap 40 is a drive stem 41, the inner end of which is provided with a drive socket to receive the polygonal stem 39. The drive stem 41 is provided with a flange 42 and a spring 43 is interposed between the flange 42 and plug valve 35 to urge the plug valve downwardly into the tapered chamber to maintain a sealing fit. The outer end of the drive stem 41 receives a handle 44, and a seal ring 45 is provided between the drive stem 41 and cap 40.

The lower end of the plug valve 35 is provided with a projection forming a stop lug 46 and the lower end of the socket forming a valve chamber 33 is provided with a pair of shoulders 47. The stop lug 46 and shoulders 47 are proportioned to provide approximately 90° of relative motion.

The depending boss 34 corresponds to the boss 5 of the first described embodiment and receives the bubble chamber assembly including the cup 22, enclosure 23 and bubbler tube 25 which communicates with the pressure sensing passage 37 and depends from the plug valve 35 in coaxial relation therewith.

The handle 44 may extend to the right as shown in FIG. 10 or to the left, in either position a pointer tip 44a registers with either of two sets of indicia ON, TEST and OFF, and the plug valve is moved accordingly. Operation is thus essentially the same as the first described embodiment.

It will be noted that, similar to the first embodiment, when the handle and plug valve are in their OFF position, both the main flow passage and pressure sensing passages are closed preventing escape of liquid from the testing chamber thus facilitating storage and shipment.

Referring to FIGS. 14 through 21, the embodiment here illustrated is similar to the embodiment shown in FIGS. 10 through 13, and its components, where similar, are identified by similar reference numerals or, where modified, by appropriate suffix letters, or additional reference numerals.

The upper portion of the valve body 30b projects above the cap 40a forming an annular rim 48 including diametrically disposed projections 49, each having a centered reference notch 50. The projections 49 form therebetween 90° slots 51. A handle 52 is provided which includes a central hub 53 joined by a screw to the drive member 41 having a polygonal drive stem 41a fitting a polygonal socket 39a.

The hub 53 is surrounded by an annular sleeve 54 forming with the hub an annular channel 55. A handle arm 56 extends radially from the sleeve 54. Received in the annular channel 55 is a spring 57, one end 58 thereof extending radially outwardly into the handle, and the other end 59 thereof is turned to tension the spring and inserted radially outwardy through a peripheral slot 60 formed in the sleeve 54 as well as into the corresponding slot 51.

Figure 17:
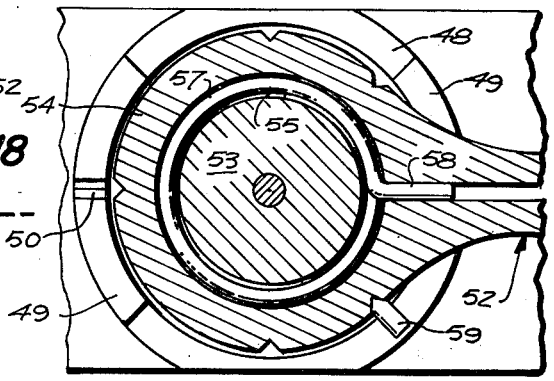
FIG. 17 is a fragmentary sectional view taken through 17—17 of FIG. 16.
Figure 18:
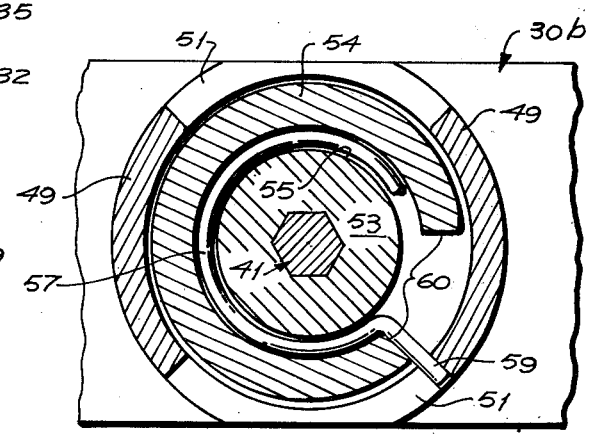
FIGS. 18, 19 and 20 are sectional views taken through 18—18 of FIG. 16 showing respectively the valve handle in its off position on and test positions.
Figure 20:
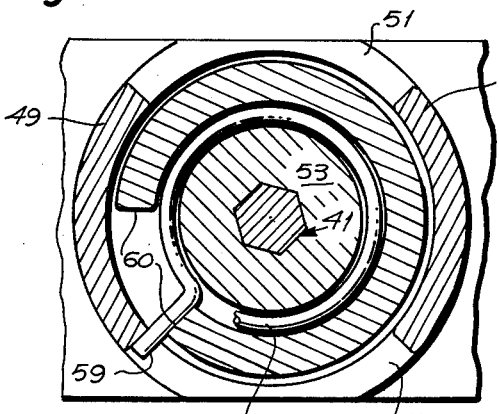
Figure 19:
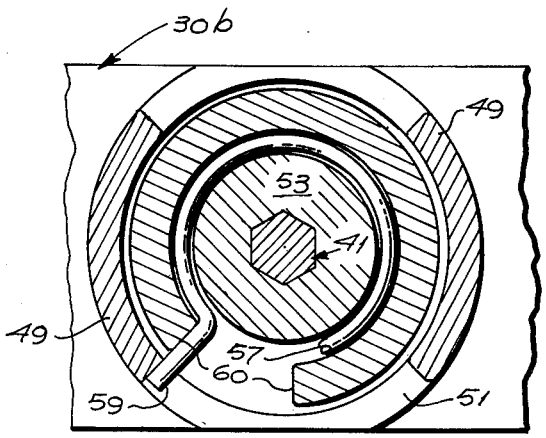

The handle arm 56 moves 90° in one direction between the OFF position and ON position of the valve 35 and 45° in the opposite direction between the OFF position and its TEST position of the valve 35. The radial end 59 of the spring moves 90° freely in its slot 51 as the handle is turned in either direction 90° between OFF and ON positions as indicated in FIGS. 17 and 19. However, when the handle arm is moved beyond 90° from the OFF to the TEST position, as shown in FIGS. 19 and 20, the end 59 of the spring engages a corresponding projection 49 and yieldably resists such further movement as it moves in slot 60. This requires the handle arm to be manually retained in the TEST position. Consequently, it is only necessary to release the handle arm and permit the spring to return the valve plug to its OFF position, thereby eliminating the chance that the valve will accidently remain in the TEST position and starve the gas system.

Figure 21:
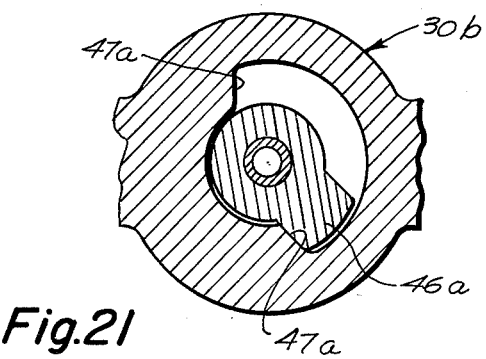
FIG. 21 is a fragmentary sectional view corresponding to FIG. 13 indicating the range of movement of the plug valve.

As shown in FIG. 21, the stop lug 46a and stop shoulders 47a are located so as to permit a 135° range of movement.

Figure 14:
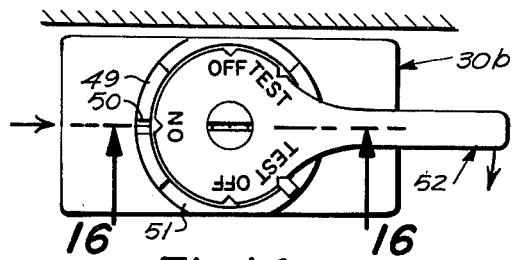
FIGS. 14 and 15 are top views of a further embodiment of the gas leak detector showing the detector in two positions adjacent a wall.
Figure 15:
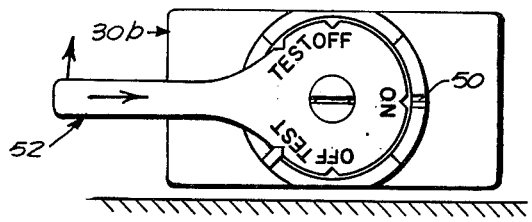
Figure 16:
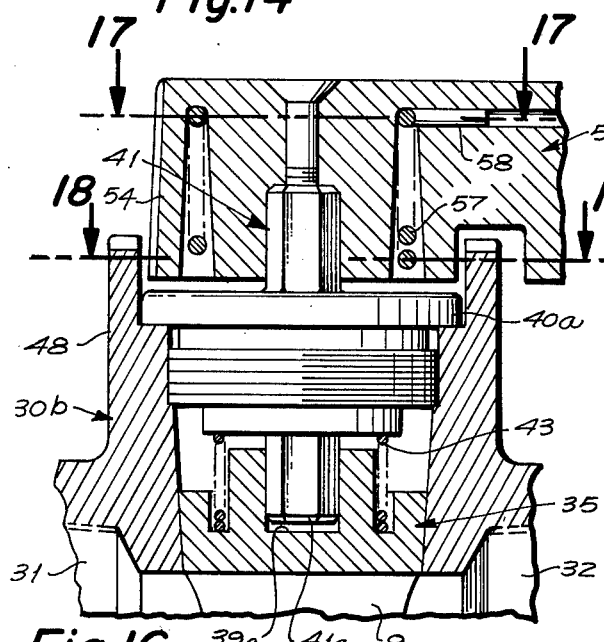
FIG. 16 is a fragmentary sectional view corresponding to FIG. 11 taken through 16—16 of FIG. 14.

The handle 52, like the handle 44, may be secured in either of two diametrically disposed positions so that the gas line may extend in either direction contiguous to a wall as indicated in FIGS. 14 and 15.

Having fully described my invention, it is to be understood that I am not to be limited to the details herein set forth, but that my invention is of the full scope of the appended claims.

I claim:

1. A leak detector for a fluid discharge system, comprising:
    a. a valve body including a main inlet for connection to a fluid supply, a main outlet for connection to a fluid discharge system, and a valve chamber therebetween;
    b. a manually operable plug valve rotatably mounted in the valve chamber, and having a transverse main flow passage connecting the main inlet and main outlet;
    c. a handle for manually rotating the plug valve;
    d. a leak detecting means including a chamber underlying the plug valve and containing a liquid exposed for observation;
    e. a first pressure sensing passage extending between the main inlet through the plug valve to the leak detecting means;
    f. and a second pressure sensing passage extending between the leak detecting means and the main outlet;
    g. the plug valve being movable between an ON position in which the main flow passage connects the main inlet and outlet; and a TEST position wherein the main flow passage is isolated from the main inlet and outlet, and the first and second pressure sensing passages interconnect the main inlet and outlet through the leak detecting means for observation of the state of the liquid in its chamber;
    h. means for limiting rotation of the plug valve between its ON position and its TEST position; and
    i. spring means engaging the plug valve to yieldably urge the plug valve from its TEST position to its OFF position.

2. A leak detector valve for a gas discharge system, comprising:
    a. a valve body including a lateral main inlet for connection to a gas supply, and a lateral main outlet for connection to a gas discharge system, and a vertically extending tapered valve chamber therebetween;
    b. a leak detector means depending from the valve chamber and including a laterally visible bubble chamber containing a liquid;
    c. a manually operable tapered plug valve rotatably mounted in sealing engagement with the valve chamber and including a main transverse flow passage, a first pressure sensing passage connecting the bubble chamber with the main inlet, and a second pressure sensing passage connecting the bubble chamber with the main outlet;
    d. the plug valve being movable between an ON position wherein the main transverse flow passage connects the main inlet and outlet, a TEST position wherein the sensing passages interconnect the bubble chamber with the main inlet and main outlet, and an OFF position wherein both the main inlet and outlets are closed and the bubble chamber is sealed;
    e. the ON and TEST positions of the plug valve being disposed in opposite peripheral directions from the OFF position;
    f. and spring means operable between the OFF and TEST positions to exert a yieldable force urging the plug valve from the TEST position to the OFF position upon manual release of the plug valve.

3. A leak detector for a fluid discharge system, comprising:
    a. a valve body including a main inlet for connection to a fluid supply, a main outlet for connection to a fluid discharge system, and a valve chamber therebetween;
    b. a manually operable plug valve rotatably mounted in the valve chamber, and having a transverse main flow passage connecting the main inlet and main outlet;
    c. a handle for manually rotating the plug valve;
    d. a leak detecting means including a chamber underlying the plug valve and containing a liquid exposed for observation;

e. a first pressure sensing passage extending between the main inlet through the plug valve to the leak detecting means;
f. and a second pressure sensing passage extending between the leak detecting means and the main outlet;
g. the plug valve being movable between an ON position in which the main flow passage connects the main inlet and outlet, and a TEST position wherein the main flow passage is isolated from the main inlet and outlet, and the first and second pressure sensing passages interconnect the main inlet and outlet through the leak detecting means for observation of the state of the liquid in its chamber;
h. the plug valve being rotatable in opposite directions from its OFF position to its ON position and its TEST position;
i. and spring means urging the plug valve form its TEST position to its OFF position, whereby manual release of the plug valve handle permits return of the plug valve to its OFF position.

* * * * *